(12) United States Patent
Penna et al.

(10) Patent No.: US 8,897,710 B2
(45) Date of Patent: Nov. 25, 2014

(54) TERMINAL

(75) Inventors: David E. Penna, Redhill (GB); Richard J. Houldsworth, Redhill (GB); Kevin R. Boyle, Horsham (GB); Bernard Hunt, Redhill (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 10/510,786

(22) PCT Filed: Apr. 3, 2003

(86) PCT No.: PCT/IB03/01347
§ 371 (c)(1),
(2), (4) Date: Feb. 6, 2012

(87) PCT Pub. No.: WO03/085273
PCT Pub. Date: Oct. 16, 2003

(65) Prior Publication Data
US 2005/0163964 A1 Jul. 28, 2005

(30) Foreign Application Priority Data
Apr. 15, 2002 (GB) .................................... 0208555

(51) Int. Cl.
*H04B 1/00* (2006.01)
*F16B 1/00* (2006.01)
*A44B 18/00* (2006.01)

(52) U.S. Cl.
CPC ........... *A44B 18/0096* (2013.01); *F16B 1/0014* (2013.01); *C08L 2201/12* (2013.01); *F16B 2001/0028* (2013.01); *A44B 18/0015* (2013.01); *A44B 18/0003* (2013.01)

USPC ......................................................... 455/63.1

(58) Field of Classification Search
CPC ............................. H04B 15/00; H04L 1/0001
USPC ............... 428/99, 100; 24/442, 451; 455/63.1
See application file for complete search history.

(56) References Cited

U.S. PATENT DOCUMENTS

| | | | |
|---|---|---|---|
| 5,241,542 A * | 8/1993 | Natarajan et al. .............. 370/311 |
| 6,598,274 B1 * | 7/2003 | Marmaropoulos .............. 24/451 |
| 6,892,076 B2 * | 5/2005 | Maalismaa et al. ......... 455/552.1 |
| 6,965,580 B1 | 11/2005 | Takagi et al. |
| 2002/0021809 A1 * | 2/2002 | Salo et al. ...................... 380/239 |
| 2002/0086641 A1 * | 7/2002 | Howard ........................ 455/67.1 |
| 2003/0228892 A1 * | 12/2003 | Maalismaa et al. ......... 455/575.7 |
| 2004/0214544 A1 * | 10/2004 | Fawcett ......................... 455/222 |
| 2005/0192048 A1 * | 9/2005 | Bridgelall ................... 455/553.1 |
| 2005/0239474 A9 * | 10/2005 | Liang ............................ 455/454 |

FOREIGN PATENT DOCUMENTS

| | | |
|---|---|---|
| EP | 0 529 269 A2 | 3/1993 |
| EP | 529 269 A | 3/1993 |
| EP | 1077539 A1 | 2/2001 |
| WO | 0117255 A1 | 3/2001 |
| WO | WO 02/03728 A | 1/2002 |
| WO | WO02/03728 A1 | 1/2002 |

* cited by examiner

*Primary Examiner* — David Bilodeau

(57) ABSTRACT

A terminal configured to receive data from a broadcast station that may simultaneously participate in a wireless network via transmissions to a wireless base station. The terminal determines time periods when data of interest to the terminal will be broadcast and schedules transmissions to the base station to avoid these time periods, thereby avoiding the transmissions preventing reception of the data of interest. The time periods may be determined amongst other means from scheduling information transmitted by the broadcast station.

12 Claims, 2 Drawing Sheets

TERMINAL

The present invention relates to a terminal which, can receive data from a broadcast station and simultaneously participate in a wireless network. The present invention also relates to a method of operating the terminal, to a broadcast station and to a signal transmitted by the broadcast station. In the present specification, the term "broadcast" is used to denote a substantially uni-directional transmission of information to a plurality of terminals, but does not exclude the presence of a return channel between a terminal and the broadcast station. Such a return channel could be provided in any convenient manner, for example via a fixed or wireless telephone connection. The term "wireless network" is used to denote a bi-directional communication link between the terminal and a base station or another terminal.

Terminals are under development which have the combined capabilities of receiving data from a broadcast network and separately interacting with a wireless network. Examples of broadcast networks include DVB-T (Terrestrial Digital Video Broadcast) and DAB (Digital Audio Broadcasting), while examples of wireless networks include GSM (Global System for Mobile communications), UMTS (Universal Mobile Telecommunication System), and wireless LAN (Local Area Network) standards such as IEEE 802.11 and Bluetooth. Current examples of such terminals include DVB-T and GSM enabled web pad devices, and high end PDAs with the ability to receive broadcasts and participate in a wireless network.

The issue of inter-operability between a terminal for a wireless network (such as GSM) and a terminal for receiving broadcast signals (such as DVB-T) has been considered in terms of the required physical separation of devices, together with choice of frequency bands and power levels, at a regulatory level. However, terminals which are capable of simultaneously receiving broadcast data and interacting with a wireless network pose additional problems. In particular, since the broadcast and wireless networks are independent, reception of data of interest from the broadcast network may be hampered by transmissions being made to the wireless network. This is because the high power levels being transmitted can swamp sensitive receiver circuitry despite the separation of frequency bands referred to above.

An object of the present invention is to address the above problem.

According to a first aspect of the present invention there is provided a terminal comprising receiver means for receiving broadcast data from a broadcast station, transceiver means for simultaneously participating in a wireless network, means for determining time periods when data of interest to the terminal will be broadcast and means for controlling the transceiver means to schedule transmissions to the wireless network to avoid interference with broadcast reception during the time periods.

By ensuring that transmissions to the wireless network are not made when data of interest Is to be received from the broadcast station, the loss of broadcast data due to the terminal transmitting on the wireless network is avoided. The broadcast signal may include additional scheduling data to provide sufficient information for the terminal to determine when it can transmit, or the broadcast signal may be sufficiently regular that the terminal can deduce suitable times for transmission without additional information. The additional data may include information on subsequent data transmissions.

In some embodiments the broadcast signal may include additional data destined for a single user (or a restricted set of users).

According to a second aspect of the present invention there is provided a communication system comprising a broadcast station and a terminal, wherein the terminal comprises receiver means for receiving broadcast data from the broadcast station, transceiver means for participating in a wireless network, means for determining time periods when data of interest to the terminal will be broadcast and means for controlling the transceiver means to schedule transmissions to the wireless network to avoid interference with broadcast reception during the time periods.

According to a third aspect of the present invention there is provided a broadcast station for transmitting broadcast data to a plurality of terminals, wherein the broadcast station comprises means for transmitting scheduling information relating to the timing of at least a portion of the broadcast data, thereby enabling the terminal to schedule transmissions to a wireless network to avoid interference with reception of the at least a portion of the broadcast data.

According to a fourth aspect of the present invention there is provided a method of operating a terminal comprising a receiver for receiving broadcast data from a broadcast station and a transceiver for participating in a wireless network, wherein the method comprises determining time periods when data of interest to the terminal will be broadcast and for controlling the transceiver to schedule transmissions to the wireless network to avoid interference with broadcast reception during the time periods.

According to a fifth aspect of the present invention there is provided a signal for transmission by a broadcast station to a terminal, the signal comprising scheduling information relating to the timing of at least a portion of the broadcast data, thereby enabling the terminal to schedule transmissions to a wireless network to avoid interference with reception at least a portion of the broadcast of the data.

The present invention is based upon the recognition, not present in the prior art, that by enabling a terminal to determine scheduling information relating to future data transmissions, data loss caused by the terminal transmitting to a wireless network at inappropriate times can be avoided.

Embodiments of the present invention will now be described, by way of example, with reference to the accompanying drawings, wherein.

In the drawings the same reference numerals have been used to indicate corresponding features.

Figure 1:
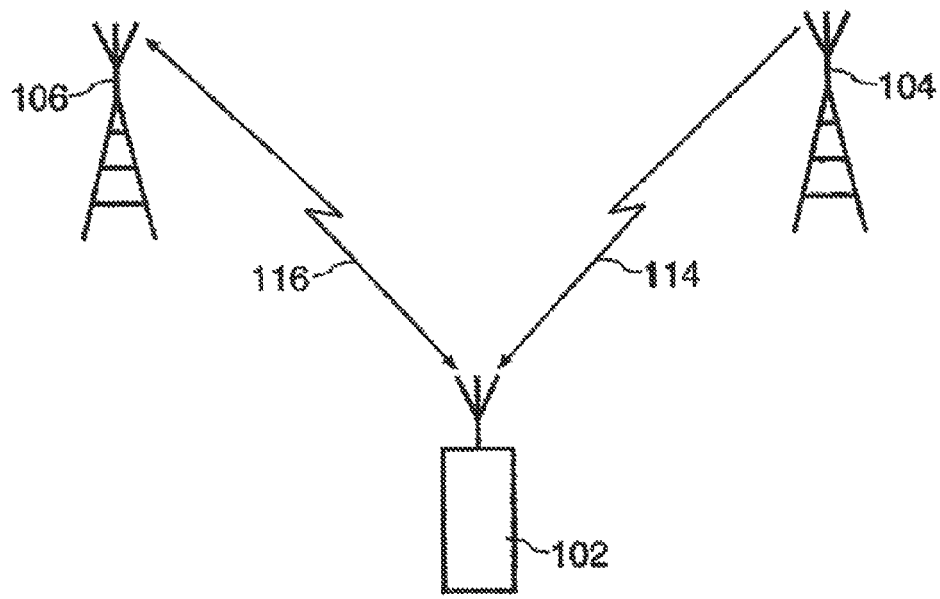
FIG. 1 is a schematic diagram of a communication system able to operate in accordance with the present invention.

FIG. 1 illustrates a communication system comprising a terminal 102, a broadcast station 104 and a base station 106 for a wireless network. There is a uni-directional communication channel 114 for broadcasting of data from the broadcast station 104 to the terminal 102, and a bi-directional communication channel 116 between the terminal 102 and the base station 106. Broadcasts on the uni-directional channel 114 may for example take place according to the DVB-T standard, and transmissions on the bi-directional channel 116 may take place according to the GSM or UMTS standards.

Figure 2:
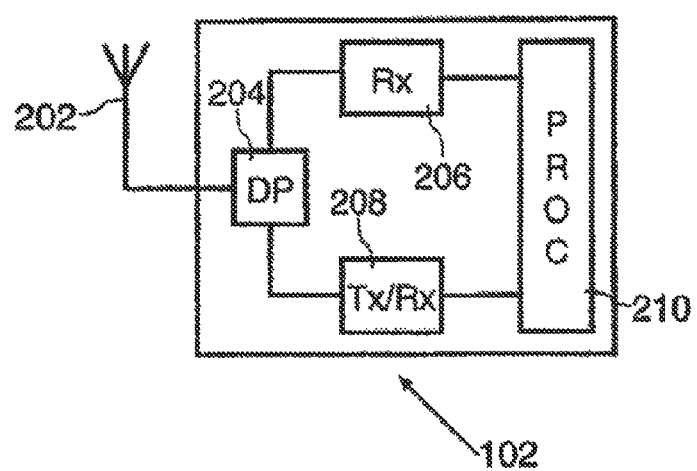
FIG. 2 is a block schematic diagram of a terminal for use in the system shown in FIG. 1.

FIG. 2 is a high-level block schematic diagram of a terminal 102, illustrating the parts relevant for an understanding of the present invention. Signals are received from channels 114, 116 and transmitted over channel 116 via an antenna 202, which may be a multi-band antenna if necessary (or a plurality of narrow-band antennas). Considering reception first, signals received by the antenna 202 pass through a diplexer (DP) 204 which includes filters so that signals received from the broadcast station 104 are routed to a broadcast receiver (Rx) 206 and signals received from the base station 106 are routed to a network transceiver (Tx/Rx) 208. In either case the received signals are down-converted to base band where the transmitted data is extracted in known manner. This data is the passed to a processor (PROC) 210 which takes appropriate actions depending on the nature of the data.

Figure 5:
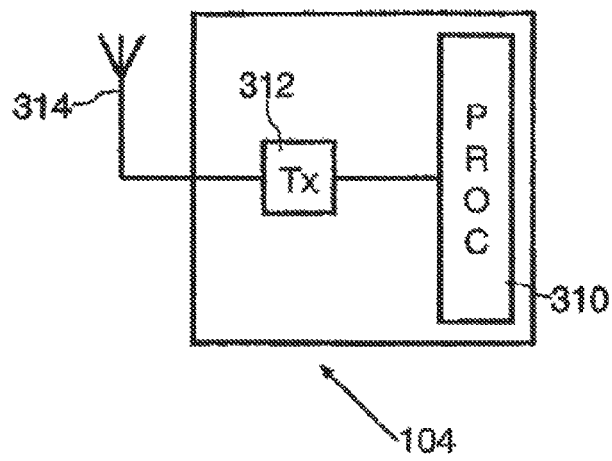
FIG. 5 is a block schematic diagram of a broadcast station for use in the system shown in FIG. 1.

FIG. 5 is a high-level block schematic diagram of the broadcast station 104. Data for transmission is processed by a processor (PROC) 310 and then passed to a transmitter 312 for transmission via an antenna 314.

Transmissions to the base station 106 proceed in the reverse order, with the processor 210 generating data for transmission which is then encoded and converted to a suitable radio frequency by the transceiver 208 for transmission. Signals for transmission pass through the diplexer 204 to the antenna 202. The function of the diplexer 204 during transmission is to ensure that signals for transmission pass directly to the antenna 202 without reaching the broadcast receiver 206.

As discussed above, a problem with this system is that the broadcast and wireless networks are independent, so it possible that the terminal will have a requirement to receive data from the broadcast station 104 at the same time as it is transmitting data to the base station 106. Such transmissions can be at a power level of 2 W or more, which places severe requirements on the diplexer 204. Taking the example of DVB-T, received signals are close to the noise floor of front-end amplifiers in the broadcast receiver 206, which can therefore easily be swamped. In many situations, 100 dB or more of isolation may be required between the transceiver 208 and receiver 206. In the terminal 102 shown in FIG. 2, this needs to be provided by the diplexer 204 in conjunction with any other filters before the front-end amplifier circuitry in the broadcast receiver 206.

Figure 3:
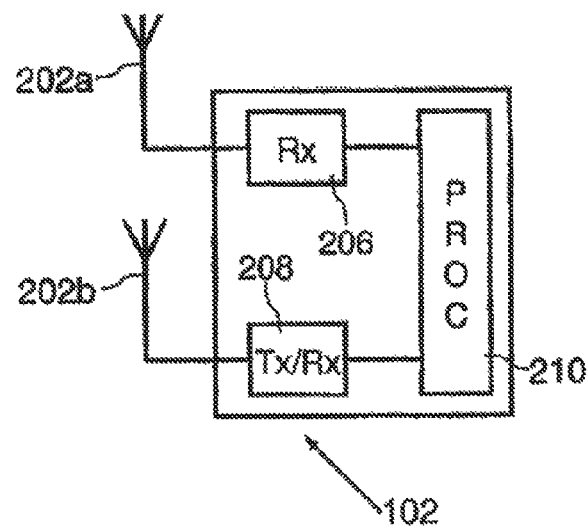
FIG. 3 is a block schematic diagram of an alternative terminal for use in the system shown in FIG. 1.

In an alternative embodiment of a terminal 102, illustrated in FIG. 3, separate antennas are provided, a first antenna 202a for reception of signals from the broadcast station 104 and a second antenna 202b for exchange of signals with the base station 106. In this embodiment the provision of separate antennas provides some isolation, but this may be quite limited. In particular, if the terminal 102 is a hand-held or portable device then the separation of the antennas 202a,202b cannot be very large and the broadcast antenna 202a is likely to receive significant signals from the wireless network antenna 202b. Even if the separation of the antennas provides 20 dB of isolation, a further 80 dB or more of isolation by filtering at the front-end of the broadcast receiver 206 is required.

If such isolation cannot be provided, the transmitted signal will block the receive amplifiers in the receiver 206, leading to data loss from the broadcast signals. The effects of this will vary, from gaps in cached broadcast material to the need for retransmission of any unicast material intended for the terminal 102.

The difficulty in achieving the isolation depends very much on the particular frequencies used for the two networks. The most difficult case is GSM transmission around 900 MHz together with DVB-T reception at the upper end of the UHF frequency band. The frequency difference is so small that tunable filters cannot easily be used, so the diplexer 204 or front-end filters might have to incorporate advanced filters, such as SAW (Surface Acoustic Wave) filters, resulting in reduced flexibility of broadcast reception frequencies.

In a system made in accordance with the present invention, these problems are avoided by the terminal 102 knowing in advance when data of interest to it will be broadcast on the broadcast channel 114, enabling the terminal to choose to transmit on the network channel 118 at a time that will not cause interference. The decision about when to transmit from the transceiver 208 can be made by cross-referencing details of available transmission slots on the network channel 116 with a schedule of the broadcast data.

The schedule is constructed in the terminal 102, and may for example be determined from prior knowledge of the broadcast schedule or from information included in the broadcast data stream for this purpose by the processor 310. Knowledge of the broadcast schedule can be obtained from a variety of sources, including use of the wireless network to access scheduling information. Other ways of obtaining such information are by the terminal 102 taking advantage of any regularity in the broadcast of data of interest, and by the broadcast station 104 transmitting fine-grained scheduling information included by the processor 310 to assist the terminal.

Figure 4:
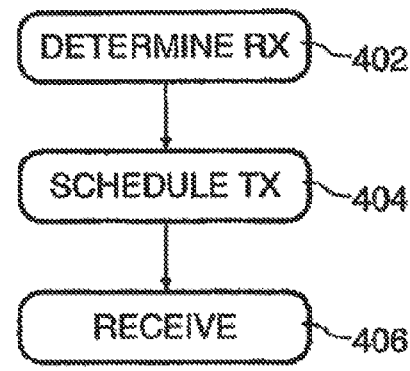
FIG. 4 is a flow chart illustrating a method of operation of a communication system in accordance with the present invention.

A flow chart summarising a method of operating a terminal made in accordance with the present invention shown in FIG. 4. Step 402 relates to the terminal determining, from scheduling information relating to the broadcast station 104, time periods during which data of interest will be transmitted by the broadcast station. Step 404 corresponds to the terminal scheduling transmissions to the base station 106 to avoid the determined time periods, thereby ensuring that the data of interest is received correctly. Finally, step 406 relates to the terminal 102 receiving broadcast data from the broadcast station 104 without interference.

In some embodiments of the present invention, the broadcast signal may include additional data intended for a single user (or a restricted set of users), for example in the form of IP data packets. This information may include information relating to subsequent data transmissions to enable the terminal to schedule transmissions on the wireless network.

Consider the broadcast aspect of a communication system made in accordance with the present invention using a DVB-T standard. DVB-T uses COFDM (Coded Orthogonal Frequency Division Multiplexing) to transport video using an MPEG standard as part of a multiplexed signal. It is possible for parts of the available transmission bandwidth for transmitting other data, such as IP packets. One possible arrangement is for bursts of IP data to be transmitted at regular intervals in the multiplexed data stream.

Hence, one option is for the receiving terminal 102 to know, through some prior information, that the data stream in which it is interested is sent at regular intervals and in such a manner that the time of arrival of the data bursts can be predicted. A second option is that additional data, for example in the IP portion of the broadcast data stream, dynamically specifies the position of future data transmissions. A third option is that the multiplexed data stream itself includes information relating to the modulation system employed which enables the terminal 102 to predict accurately the time at which each of the component parts of the multiplexed stream will be transmitted.

One or more of these options provides a mechanism for the terminal 102 to determine periods when the broadcast receiver 206 must be able to receive data, and periods where interfering local transmissions from the network transceiver 208 can be tolerated.

Now consider the wireless network aspect of the present invention. Considering first GSM, this is a TDD (Time Division Duplex) system in which data is transmitted in time slots, which are themselves grouped into frames. For a voice call, the base station 106 will allocate one of eight slots in each time frame to the terminal 102, and the terminal will fill the specified slot with voice data. In this case it is therefore not easy to synchronise transmissions with gaps in the reception of required broadcast data. However, many GSM terminals also support packet switched data sessions according to the GPRS (General Packet Radio Service) standard. When using GPRS, the terminal 102 is free to choose whether to use the slots allocated to it in any frame. Hence, the terminal 102 is able to disable transmission when required to avoid conflicting with incoming data of interest.

Turning to UMTS, this system has both TDD and FDD (Frequency Division Duplex) modes of operation, both transmitted using CDMA (Code Division Multiple Access). In FDD mode, uplink and downlink transmissions take place on separate frequency bands enabling continuous bi-directional transmissions. For circuit switched sessions in FDD mode (e.g. for voice calls or streaming content), a mechanism called compressed mode is provided which enables the terminal 102 to stop transmitting for up to 7 out of the 15 slots in a 10 ms frame. Longer periods of non-transmission, of nearly 10 ms, can be arranged by scheduling a gap in transmission at the end of one frame and at the start of the next frame. Such a gap may be sufficient to enable reception of important incoming broadcast data.

In both FDD and TDD modes, packet switched sessions can be used for the transfer of non real-time critical data. In this case the terminal 102 requests permission to send small amounts of data to the base station 106 as it wishes, with no dedicated link being set up. Hence, the terminal 102 can easily create transmission gaps of any desired length and at any desired time by not attempting to initiate a packet transfer.

As well as its application to separate broadcast and wireless network systems, the present invention could be applied to a system which has a broadcast mode as well as a network mode. An example of such a system is UMTS multimedia broadcast or multicast.

From reading the present disclosure, other modifications will be apparent to persons skilled in the art. Such modifications may involve other features which are already known in the design, manufacture and use of communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A terminal comprising:
   a receiver configured to receive broadcast data from a broadcast station based on a schedule that is independent of the terminal,
   a transceiver configured to simultaneously participate in a wireless network,
   a processor configured to:
   determine time periods when data of interest to the terminal will be broadcast, and
   control the transceiver to schedule transmissions to the wireless network to avoid transmission to the wireless network during time periods that would interfere with broadcast reception of the data of interest of the scheduled broadcast data.

2. The terminal as claimed in claim 1, wherein the processor is configured to determine the time periods from observed patterns in the transmission of data by the broadcast station.

3. The terminal as claimed in claim 1, wherein the processor is configured to determine the time periods from additional data transmitted by the broadcast station specifying the transmission time of forthcoming data prior to its transmission.

4. The terminal as claimed in claim 1, wherein the processor is configured to determine the time periods from information accessed via the wireless network.

5. A communication system comprising;
   a broadcast station; and
   a terminal, wherein the terminal comprises:
   a receiver configured to receive broadcast data from the broadcast station based on a schedule that is independent of the terminal,
   a transceiver configured to participate in a wireless network,
   a processor configured to:
   determine time periods when data of interest to the terminal will be broadcast, and
   control the transceiver to schedule transmissions to the wireless network to avoid transmission to the wireless network during time periods that would interfere with broadcast reception of the data of interest of the scheduled broadcast data.

6. The system as claimed in claim 5, wherein the broadcast station forms part of the wireless network and operates according to a broadcast mode of that network.

7. A broadcast station for transmitting broadcast data to a plurality of terminals based on a schedule that is independent of the terminals, the broadcast station comprising a transmitter configured to broadcast scheduling information relating to the timing of at least a portion of the broadcast data, thereby enabling the terminal to schedule transmissions to a wireless network to avoid transmission to the wireless network during time periods that would interfere with reception by the terminal of data of interest of the scheduled broadcast data.

8. The station as claimed in claim 7, wherein the portion of the broadcast data is sent as data bursts at regular intervals and the scheduling information comprises the transmission times of previous data bursts, from which the timing of future data bursts can be determined.

9. The station as claimed in claim 7, wherein the scheduling information comprises additional data specifying the transmission time of forthcoming data prior to its transmission.

10. A method of operating a terminal comprising a receiver for receiving broadcast data from a broadcast station and a transceiver for participating in a wireless network, wherein the method comprises acts of
    determining time periods when data of interest to the terminal will be broadcast based on a schedule that is independent of the terminal, and
    controlling the transceiver to schedule transmissions to the wireless network to avoid transmission to the wireless network during time periods that would interfere with broadcast reception of the data of interest of the scheduled broadcast data.

11. A processor for operating a terminal comprising a receiver for receiving broadcast data from a broadcast station and a transceiver for participating in a wireless network, the processor comprising a portion configured to
- determine time periods when data of interest to the terminal will be broadcast based on a schedule that is independent of the terminal, and
- control the transceiver to schedule transmissions to the wireless network to avoid transmission to the wireless network during time periods that would interfere with broadcast reception of the data of interest of the scheduled broadcast data.

12. The processor as claimed in claim 11, wherein the processor is configured to disable transmission when required to avoid conflicting with broadcast reception.

* * * * *